(12) United States Patent
Li

(10) Patent No.: US 11,394,917 B2
(45) Date of Patent: Jul. 19, 2022

(54) IMAGE PROCESSING METHOD AND DEVICE FOR AERIAL CAMERA, AND UNMANNED AERIAL VEHICLE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 17/240,157

(22) Filed: Apr. 26, 2021

(65) Prior Publication Data

US 2021/0250539 A1 Aug. 12, 2021

Related U.S. Application Data

(63) Continuation of application No. PCT/CN2019/111960, filed on Oct. 18, 2019.

(30) Foreign Application Priority Data

Oct. 26, 2018 (CN) .......................... 201811260525.3

(51) Int. Cl.
*H04N 5/45* (2011.01)
*B64C 39/02* (2006.01)
(Continued)

(52) U.S. Cl.
CPC ............. *H04N 5/45* (2013.01); *B64C 39/024* (2013.01); *H04N 5/23238* (2013.01);
(Continued)

(58) Field of Classification Search
None
See application file for complete search history.

(56) References Cited

U.S. PATENT DOCUMENTS

2003/0083835 A1    5/2003  Cheng
2011/0249073 A1*  10/2011  Cranfill ................. G06F 3/0488
                                                                348/14.02
(Continued)

FOREIGN PATENT DOCUMENTS

CN        206533440 U      9/2017
CN        108289161 A      7/2018
(Continued)

OTHER PUBLICATIONS

PCT International Search Report, PCT/CN2019/111960, dated Jan. 6, 2020.

*Primary Examiner* — Eileen M Adams

(57) ABSTRACT

Embodiments of the present invention relate to an image processing method and device for an aerial camera, and an unmanned aerial vehicle. The method includes: receiving first image data and second image data, the first image data being image data from a high-resolution visible light lens and the second image data being infrared data from an infrared thermal imaging lens; cutting a target region from the first image data; displaying the target region in a first picture and displaying the second image data in a second picture respectively; and superimposing the first picture and the second picture to generate a picture-in-picture image. In this way, a function of magnifying a local target region can be implemented, thereby effectively improving user experience, and meeting requirements of a user for detailed viewing of a specific target.

22 Claims, 6 Drawing Sheets

(51) Int. Cl.
*H04N 5/232* (2006.01)
*H04N 5/262* (2006.01)
*H04N 5/272* (2006.01)
*H04N 5/77* (2006.01)

(52) U.S. Cl.
CPC .......... *H04N 5/2628* (2013.01); *H04N 5/272* (2013.01); *H04N 5/77* (2013.01); *B64C 2201/123* (2013.01)

(56) References Cited

U.S. PATENT DOCUMENTS

| | | | | |
|---|---|---|---|---|
| 2017/0359515 | A1* | 12/2017 | Harris | G06K 9/0063 |
| 2018/0108136 | A1 | 4/2018 | Lai et al. | |
| 2018/0302564 | A1* | 10/2018 | Liu | H04N 17/002 |
| 2019/0073534 | A1* | 3/2019 | Dvir | G06K 9/4652 |
| 2019/0094861 | A1* | 3/2019 | Menzel | G08G 5/0069 |

FOREIGN PATENT DOCUMENTS

| | | |
|---|---|---|
| CN | 108622428 A | 10/2018 |
| CN | 109150402 A | 1/2019 |

* cited by examiner

IMAGE PROCESSING METHOD AND DEVICE FOR AERIAL CAMERA, AND UNMANNED AERIAL VEHICLE

CROSS REFERENCE

This application is a continuation application of International Application No. PCT/CN2019/111960, filed on Oct. 18, 2019, which claims priority of Chinese Patent Application No. 2018112605253, filed on Oct. 26, 2018, which is incorporated herein by reference in its entirely.

BACKGROUND

Technical Field

The present invention relates to the field of aerial photography technologies, and in particular, to an image processing method and device for an aerial camera, and an unmanned aerial vehicle.

Related Art

As hovering air vehicles featuring strong adaptability, low costs in use, and quick deployment, unmanned aerial vehicles have been widely applied to many different occasions, and can be equipped with different types of functional components to realize various functions.

Acquiring image data from the air for aerial photographic reconnaissance is a very important use of the unmanned aerial vehicles at present. An existing unmanned aerial vehicle is usually equipped with an aerial camera formed by a combination of a plurality cameras, to capture image data of visible light and corresponding infrared thermal imaging.

The application of such an aerial camera can enable a user on the ground side to obtain infrared imaging images and visible light images at the same time, which is convenient for the user to complete an aerial photographic reconnaissance task and obtain more detailed and accurate related information (for example, topographic information, buildings and traffic road information during photographing).

However, an existing aerial camera usually has a limited aerial camera resolution, which can hardly acquire accurate image details and cannot support requirements of the user for acquiring details in local regions during the aerial photographic reconnaissance. How to adjust the image acquisition and processing modes of the aerial camera to meet the use requirements of the user during the aerial photographic reconnaissance is a problem to be resolved urgently at present.

SUMMARY

To resolve the foregoing technical problem, embodiments of the present invention provide an image processing method, an image processing system and an unmanned aerial vehicle that simultaneously take acquisition of details in a local region and observation from a global field of view into consideration.

To resolve the foregoing technical problem, the embodiments of the present invention provide the following technical solution: an image processing method for an aerial camera. The image processing method includes:

receiving first image data and second image data, the first image data being image data from a high-resolution visible light lens and the second image data being infrared data from an infrared thermal imaging lens; and cutting a target region from the first image data; displaying the target region in a first picture and displaying the second image data in a second picture respectively; and superimposing the first picture and the second picture to generate a picture-in-picture image.

Optionally, the method further includes: receiving third image data and displaying the third image data in a third picture, the third image data being image data from a wide-angle lens; and superimposing the third picture on the first picture to generate a picture-in-picture image including the first picture, the second picture and the third picture.

Optionally, the method further includes: respectively independently storing the first image data, the second image data and the third image data in corresponding storage regions.

Optionally, the method further includes: encoding the picture-in-picture image, and transmitting picture-in-picture image data obtained by the encoding.

Optionally, the cutting a target region from the first image data specifically includes: selecting center coordinates and a magnification of the target region; magnifying the first image data according to the magnification; and determining a position of the target region in the magnified first image data according to the center coordinates, a size of the target region being the same as a size of the first picture.

Optionally, the determining a position of the target region in the magnified first image data according to the center coordinates specifically includes:

determining whether distances between the center coordinates and edges of the magnified first image data are greater than an allowable distance;

if the distances are greater than the allowable distance, cutting the target region from the magnified first image data by using the center coordinates as a center of the target region; and if the distances are not greater than the allowable distance, cutting the target region closely along one of the edges of the magnified first image data.

Optionally, the determining whether distances between the center coordinates and edges of the magnified first image data are greater than an allowable distance includes:

determining that the distances between the center coordinates and the edges of the magnified first image data are greater than the allowable distance when a first condition to a fourth condition below are met simultaneously;

$$\text{first condition: } nx \geq \frac{w}{2}$$
$$\text{second condition: } n(w-x) \geq \frac{w}{2}$$
$$\text{third condition: } ny \geq \frac{h}{2}$$
$$\text{fourth condition: } n(h-y) \geq \frac{h}{2}$$

where w and h are respectively an image width and an image height in the first image data, (x, y) is the center coordinates, and n is the magnification.

Optionally, the cutting the target region closely along one of the edges of the magnified first image data includes: cutting the target region closely along a left edge of the magnified first image data when the first condition is not met; cutting the target region closely along a right edge of the magnified first image data when the second condition is not met; cutting the target region closely along a top edge of the magnified first image data when the third condition is not met; and cutting the target region closely along a bottom edge of the magnified first image data when the fourth condition is not met.

To resolve the foregoing technical problem, the embodiments of the present invention further provide the following technical solution: an image processing system.

The image processing system includes: a cutting module, configured to cut a target region in first image data, the first image data being image data from a high-resolution visible light lens; and a picture-in-picture synthesis module, configured to superimpose a first picture and a second picture, to generate a picture-in-picture image, the target region being displayed in the first picture, and second image data being displayed in the second picture, the second image data being infrared data from an infrared thermal imaging lens.

Optionally, the image processing system further includes: an encoding module, configured to encode the picture-in-picture image in a preset encoding format and output the encoded picture-in-picture image.

Optionally, the picture-in-picture synthesis module is further configured to superimpose a third picture on the first picture, to generate a picture-in-picture image including the first picture, the second picture and the third picture, third image data being displayed in the third picture, the third image data being image data from a wide-angle lens.

Optionally, the cutting module is further configured to cut the target region from the first image data by using the foregoing image processing method.

To resolve the foregoing technical problem, the embodiments of the present invention further provide the following technical solution: an unmanned aerial vehicle, including a vehicle body, an aerial camera mounted on the vehicle body and an image processing system installed in the vehicle body, where the aerial camera includes a high-resolution visible light lens and an infrared thermal imaging lens; and the image processing system is connected to the aerial camera and is configured to perform the foregoing image processing method according to user instructions, to output a picture-in-picture image.

Optionally, the aerial camera further includes a wide-angle lens.

Optionally, the unmanned aerial vehicle further includes a mass storage device, configured to independently store image data captured by different lenses of the aerial camera.

Compared with the prior art, the image processing method provided in the embodiments of the present invention provides finer and richer image data by using a large-resolution zoom lens, to implement a function of magnifying a local target region, thereby effectively improving user experience, and meeting requirements of a user for viewing details of a specific target.

Further, a global image is integrated as a picture-in-picture image, so that the user can control and understand the global image while paying attention to details of a local target region, to better complete an aerial photography task.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component need to have a specific orientation or need to be constructed and operated in a specific orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the specification are the same as that usually understood by a person skilled in the technical field to which the present invention belongs. Terms used in the specification of the present invention are merely intended to describe objectives of the specific embodiments, and are not intended to limit the present invention. A term "and/or" used in this specification includes any or all combinations of one or more related listed items.

In addition, technical features involved in different embodiments of the present invention described below may be combined together if there is no conflict.

Aerial photographic reconnaissance refers to causing an aerial vehicle deployed in the air to move along a specific route and at a specific altitude and capture images of a region to implement functions such as monitoring and reconnaissance. With the continuous development of unmanned aerial vehicles, currently more and more aerial photography reconnaissance tasks are carried out by unmanned aerial vehicles.

Figure 1:
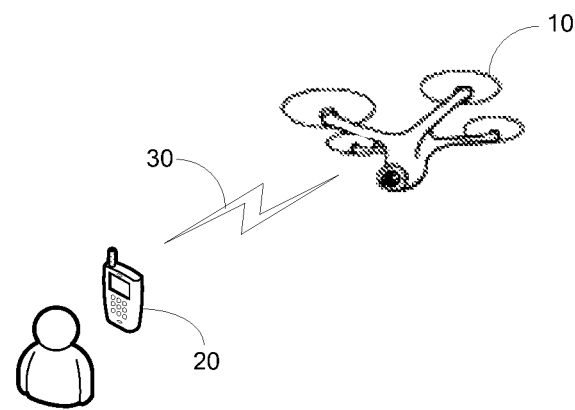
FIG. 1 is a schematic diagram of an application environment according to an embodiment of the present invention.

FIG. 1 is an application environment according to an embodiment of the present invention. As shown in FIG. 1, the application environment includes an unmanned aerial vehicle 10, a smart terminal 20 and a wireless network 30.

The unmanned aerial vehicle 10 may be any type of power-driven (for example, electricity-driven) unmanned aerial vehicle, including, but not limited to, a quadrotor unmanned aerial vehicle, a fixed-wing aircraft and a helicopter model. In this embodiment, the quadrotor unmanned aerial vehicle is used as an example for description.

Figure 11:
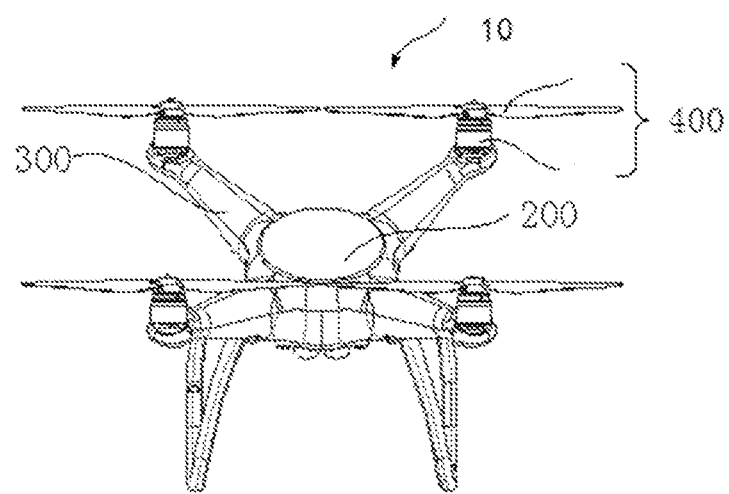
FIG. 11 is a view of an unmanned aerial vehicle.

As shown in FIG. 11, the unmanned aerial vehicle 10 includes a body 200, arms 300 connected to the body, power apparatuses 400 mounted on the arms 300, and a flight control module, a communication module, a GPS communication module and the like (not shown in FIG. 11) that are mounted in the body 200.

In another embodiment, the unmanned aerial vehicle 10 may be any other suitable type of unmanned aircraft, such as a tiltrotor unmanned aerial vehicle or a vertical take-off and landing fixed-wing unmanned aerial vehicle. The power apparatuses 400 include engines (for example, motors), power sources (for example, batteries), power transmission (for example, electronic tuning) and the like. A quantity, a structure and a mounting position of the power apparatuses 400 may be changed according to actual requirements when applied to different types of unmanned aerial vehicles, which is not limited in the present invention. In another possible embodiment, the unmanned aerial vehicle 10 may further include a gimbal (not shown in FIG. 11). The gimbal is mounted at the bottom of the body 200 and is configured to be equipped with a high-definition digital camera or another photographing apparatus to eliminate disturbances received by the high-definition digital camera or another photographing apparatus, ensuring clarity and stability of videos captured by the camera or photographing apparatus.

The unmanned aerial vehicle 10 has a volume or power corresponding to an actual requirement, which can provide a user with a load capacity, a flight speed and a flight mileage that meet use requirements. The unmanned aerial vehicle 10 is equipped with one or more functional modules to perform corresponding tasks (for example, aerial photographic reconnaissance).

Figure 2:
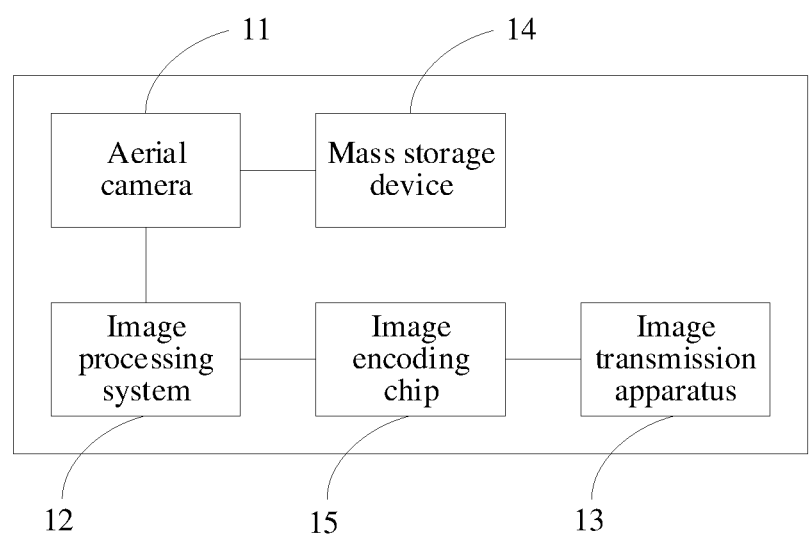
FIG. 2 is a functional block diagram of an unmanned aerial vehicle according to an embodiment of the present invention.

FIG. 2 is a functional block diagram of an unmanned aerial vehicle 10 according to an embodiment of the present invention. As shown in FIG. 2, in this embodiment, the unmanned aerial vehicle 10 may be equipped with an aerial camera 11, an image processing system 12, an image transmission apparatus 13 and a mass storage device 14.

The aerial camera 11 may be mounted on the unmanned aerial vehicle 10 by using mounting and fixing components such as a gimbal, and is configured to acquire image information of a target region during the flight. The image transmission apparatus is connected to the aerial camera and is a graphic data transmission system. The image transmission apparatus may transmit data acquired by the aerial camera outwards based on a communication connection manner such as radio frequency.

The aerial camera may have two or more lenses, which are respectively configured to acquire different types of image data. For example, the aerial camera may include a high-resolution visible light lens and an infrared thermal imaging lens, to respectively provide high-resolution image data and infrared image data of the target region.

Specifically, the high resolution refers to image data that meets high-definition or ultra-high-definition image standards (for example, a 4K resolution). Fine information of the target region can be provided by using the high-resolution visible light lens, to support a local magnification function of the user, so that the user can magnify a target region or a local region of interest during the aerial photographic reconnaissance.

Certainly, the high-resolution visible light lens may alternatively be a lens with a specific optical zoom capability (for example, a high-definition camera with a 4K resolution that can support 30× optical zoom), which magnifies the local region of interest of the user by changing an optical focal length.

In some embodiments, the aerial camera may further include a wide-angle lens with a relatively large field of view (for example, 140° or greater). Compared with the high-resolution visible light lens, the wide-angle lens may be a VGA lens with a lower resolution. The wide-angle lens has a larger field of view, which may be used as a supplement to provide the user with panoramic aerial images, thereby maintaining attention to a global image.

The image transmission apparatus 13 is a data transmission apparatus disposed at one end of the unmanned aerial vehicle and configured to transmit processed video data to the smart terminal or another ground-end device. The image transmission apparatus may be provided with a corresponding antenna and a radio frequency unit, to load image data on a radio frequency signal for transmission.

Specifically, as shown in FIG. 2, the unmanned aerial vehicle may be further equipped with an independent image encoding chip 15. The image encoding chip 15 is disposed between the image transmission apparatus 13 and the image processing system 12 and is configured to encode a picture-in-picture image outputted by the image processing system 12 in a preset encoding format (for example, H265 encoding) and output the encoded picture-in-picture image to the image transmission apparatus 13.

Certainly, the image encoding chip 15 may alternatively be integrated into another functional system of the unmanned aerial vehicle as a functional module thereof.

The mass storage device 14 is a device module connected to the aerial camera, which may specifically be any type of non-volatile storage device, such as an SD card, a flash memory or an SSD hard disk. The mass storage device 14 may be divided into one or more storage regions.

Image data (for example, a high-resolution image or an infrared thermal imaging image) captured by different lenses of the aerial camera is respectively independently stored in different storage regions as a backup and record of original data, and may be exported or provided for use of subsequent functions.

Data acquired by the aerial camera may be stored in the mass storage device 14 in one or more forms. For example, the data may be encoded by the JPEG standard and saved in the form of pictures; or may be encoded by the H265 standard and saved in the form of video files.

The image processing system 12 is a hardware processing system used for receiving image data acquired by the aerial camera and performing one or more of image processing such as compression, superimposition and cutting on the image data. For example, based on multichannel data acquired by different lenses of the aerial camera, output of the image processing system may be a picture-in-picture image formed by superimposing a plurality of images.

Figure 3:
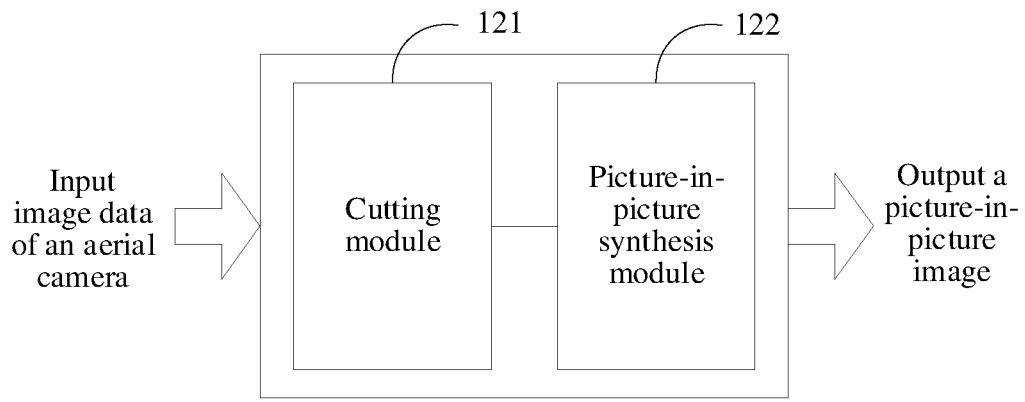
FIG. 3 is a structural block diagram of an image processing system according to an embodiment of the present invention.

FIG. 3 is a functional block diagram of an image processing system according to an embodiment of the present invention. As shown in FIG. 3, the image processing system may include: a cutting module 121 and a picture-in-picture synthesis module 122.

The image processing system may have a corresponding data input terminal, which is connected to the aerial camera in a wired or wireless manner and is configured to receive first image data, second image data and third image data acquired by the aerial camera, and provide the first image data, the second image data and the third image data acquired by the aerial camera to subsequent functional modules for processing.

In this embodiment, the first image data represents image data from the high-resolution visible light lens, the second image data represents infrared data from the infrared thermal imaging lens, and the third image data represents global image data from the wide-angle lens.

The cutting module 121 is a preprocessing unit configured to cut a target region from the first image data. The target region is a region of interest of the user during aerial photographing, which may be determined according to user instructions. For example, the user may select the target region in one or more manners such as by using a joystick. The first image data is the image data acquired by the high-resolution lens. The first image data has relatively high pixels and can still maintain a good resolution after being cut and magnified.

The picture-in-picture synthesis module 122 is a hardware module configured to superimpose multichannel video data to generate a picture-in-picture image. The picture-in-picture image is an existing special manner of presenting video content. Specifically, the picture-in-picture image means that when image data of one channel is displayed in full screen, image data of another channel is played on a partial region of the full-screen displayed image (shown in FIG. 4).

In this embodiment, the picture-in-picture synthesis module 122 receives the inputted target region and second image data, and respectively displays the inputted target region and second image data in a first picture and a second picture to generate the picture-in-picture image. In some other embodiments, when receiving the third image data (for example, image data from the wide-angle lens), the picture-in-picture synthesis module 122 may further superimpose a third picture on the picture-in-picture image, to display the third image data (shown in FIG. 4).

Figure 4:
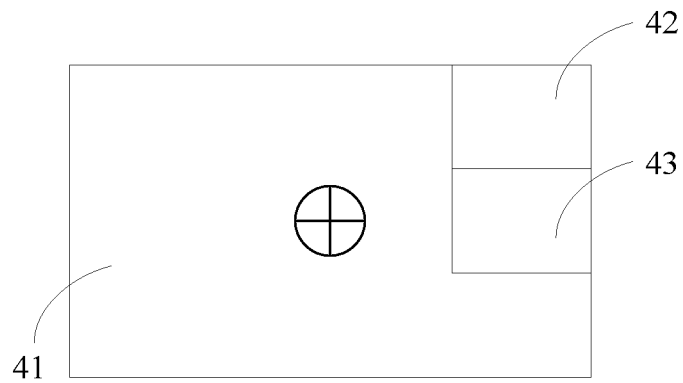
FIG. 4 is a schematic diagram of a picture-in-picture image according to an embodiment of the present invention.

FIG. 4 is a specific example of a picture-in-picture image according to an embodiment of the present invention. As shown in FIG. 4, in this embodiment, the picture-in-picture image includes a main display picture 41 and two secondary display pictures 42 and 43 superimposed on the main display picture. The first picture, the second picture and the third picture may all be selected as the main display picture. After the main display picture is selected, the other pictures are used as the secondary display pictures. In FIG. 4, the first picture is used as an example of the main display picture.

Such a method allows the user to observe a target region of interest of the user that needs to be magnified on the main display picture, and at the same time, maintain attention to a global field of view and infrared imaging information by using the two secondary display pictures, thereby providing the user with better and more comprehensive aerial photographic reconnaissance results.

It should be noted that FIG. 3 describes in detail the structure of the image processing system provided in the embodiments of the present invention by using a functional block diagram as an example. A person skilled in the art may choose to use software, hardware or a combination of software and hardware to implement functions of one or more of the foregoing functional modules according to the inventive ideas disclosed in the specification, the steps to be performed and the functions to be implemented and requirements of actual situations (for example, chip power consumption, limitations on heat generation, silicon wafer costs or chip volume). For example, the use of more software parts can reduce costs of a chip and a circuit area occupied, and facilitate modification. The use of more hardware circuits can improve reliability and a computing speed.

Figure 5:
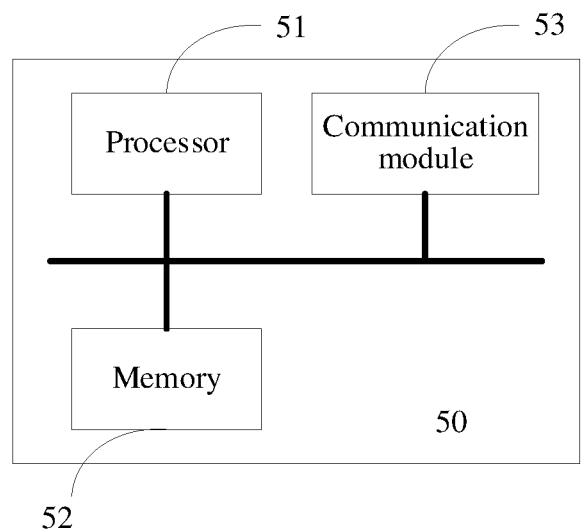
FIG. 5 is a structural block diagram of an electronic computing device according to an embodiment of the present invention.

FIG. 5 is a structural block diagram of an electronic computing device according to an embodiment of the present invention. The electronic computing device may be configured to implement the image processing system provided in the embodiments of the present invention, perform functions of the functional modules shown in FIG. 3, and output the corresponding picture-in-picture image.

As shown in FIG. 5, an electronic computing platform 50 may include a processor 51, a memory 52 and a communication module 53. Any two of the processor 51, the memory 52 and the communication module 53 are communicatively connected by using a bus.

The processor 51 may be any type of integrated circuit provided with one or more processing cores. The processor 51 can perform single-thread or multi-thread operations, and is configured to parse instructions to perform operations such as obtaining data, performing logical operation functions and delivering operation processing results. The processor 51 is provided with several data interfaces, which may be configured to form a data input end or output end.

The memory 52 is used as a non-volatile computer-readable storage medium, for example, at least one magnetic disk storage device, a flash memory, a distributed storage device remotely disposed relative to the processor 51 or another non-volatile solid-state storage device.

The memory 52 may have a program storage region used for storing a non-volatile software program, a non-volatile computer-executable program and a module to be invoked by the processor 51 to enable the processor 51 to perform one or more method steps. The memory 52 may further have a data storage region used for storing the operation processing result delivered and outputted by the processor 52.

The communication module 53 is a hardware unit configured to establish communication connections and provide a physical channel for data transmission. The communication module 53 may be any type of wireless or wired communication module, including, but not limited to, a WiFi module or a Bluetooth module, which is connected to other systems or functional units in the unmanned aerial vehicle 10 (for example, an image transmission system), to provide processed picture-in-picture image data or original data acquired by the aerial camera.

Still referring to FIG. 1, the smart terminal 20 may be any type of smart device configured to establish a communication connection with the unmanned aerial vehicle, such as a mobile phone, a tablet computer or a smart remote control. The smart terminal 20 may be equipped with one or more different user interaction apparatuses, and acquire user instructions or display and feed back information to the user based on the user interaction apparatuses.

The interaction apparatuses include, but not limited to, a button, a rolling wheel, a display screen, a touchscreen, a mouse, a speaker and a joystick. For example, the smart terminal 20 may be equipped with a touch display screen. A remote control instruction of the user for the unmanned aerial vehicle is received by using the touch display screen, and the picture-in-picture image is displayed to the user by using the touch display screen. The user may further switch image information currently displayed on the display screen by remotely controlling the touchscreen, for example, select the first picture or the second picture as the main display picture.

By using the smart terminal 20, the user can observe image information of three channels (that is, large-resolution visible light images, infrared thermal imaging images and VGA large field of view images) on the ground, and maintain attention to global and infrared imaging when magnifying and observing a region of interest.

The wireless network 30 may be a wireless communication network configured to establish a data transmission channel between two nodes based on any type of data transmission principle, for example, a Bluetooth network, a WiFi network, a wireless cellular network or a combination thereof at different signal frequency bands. A frequency band or a network form specifically used by the wireless network 30 are related to communication devices adopted in the unmanned aerial vehicle 10 and the smart terminal 20 (for example, specifically used image transmission apparatuses).

The application environment shown in FIG. 1 only shows the application of the image processing system for aerial photographic reconnaissance on the unmanned aerial vehicle. A person skilled in the art can understand that the image processing system may alternatively be installed on another type of mobile vehicle (for example, a remote control car), to receive multichannel image data acquired by a plurality of cameras and perform the same functions. The inventive idea of the image processing system disclosed in the embodiments of the present invention is not limited to being applied to the unmanned aerial vehicle shown in FIG. 1.

Figure 6:
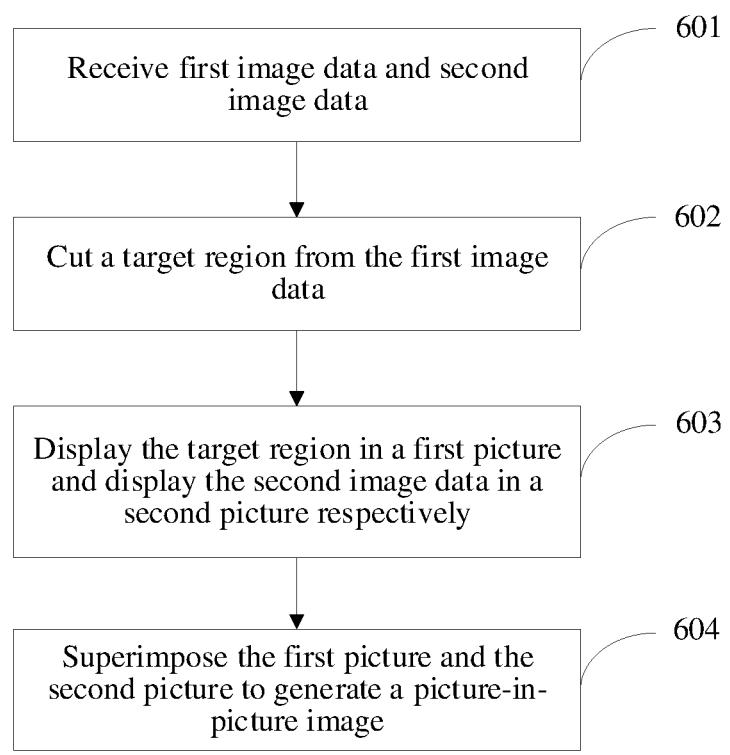
FIG. 6 is a method flowchart of an image processing method according to an embodiment of the present invention.

FIG. 6 is a method flowchart of an image processing process according to an embodiment of the present invention. The image processing process may be implemented by the image processing system and/or the functional modules connected to the image processing system disclosed in the foregoing embodiments. As shown in FIG. 6, the method may include the following steps:

601. Receive first image data and second image data, the first image data being image data from a high-resolution visible light lens and the second image data being infrared data from an infrared thermal imaging lens.

In this embodiment, two different channels of input image data are used as an example for description. In some other embodiments, more channels of input image data may be further included, to provide comprehensive image information (for example, third image data provided by the wide-angle lens).

The first image data, the second image data or the third image data is only used for distinguishing image data acquired from different lenses or image acquisition devices, and does not constitute any limitation on the data. The image data may be specifically transmitted in any suitable format or form, and may have different frame rates, compression rates or resolutions according to characteristics of the lenses and data transmission limitations.

602. Cut a target region from the first image data.

Figure 8:
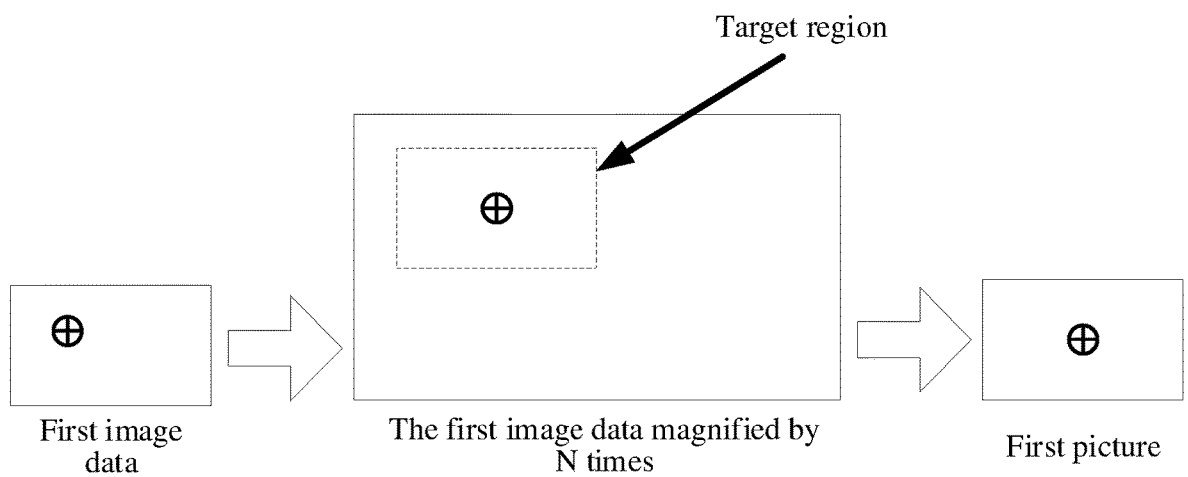
FIG. 8 is a schematic diagram of cutting first image data according to an embodiment of the present invention.

"Cutting" is a commonly used processing method in image processing, which, as shown in FIG. 8, means cutting out image data of a partial region from an image frame with a relatively large size.

The target region refers to a region or position of a target (for example, a building or a mountain) of interest of the user during the aerial photographic reconnaissance. Usually, a size of the target region may be limited by a size of a display screen of the smart terminal 20.

603. Display the target region in a first picture and display the second image data in a second picture respectively.

Both the first picture and the second picture refer to independent display windows used for displaying one channel of image data. Playing is performed in each window independently and the size of each window may be adjusted (for example, magnified or narrowed according to control instructions). In some embodiments, when there is third channel of image data or more channels of image data, more third pictures may be further disposed correspondingly, so that a plurality of channels of different image data are independently displayed and played in different display windows.

604. Superimpose the first picture and the second picture to generate a picture-in-picture image.

The first picture and the second picture (or the third picture) have different sizes. A corresponding picture-in-picture image may be generated by superimposing a picture with a smaller area on a picture with a larger area. For example, as shown in FIG. 4, the first picture may have a largest area (occupying the entire display screen of the smart terminal). The second picture and the third picture are respectively superimposed on the first picture to form a picture-in-picture image including the first picture, the second picture and the third picture.

Figure 7:
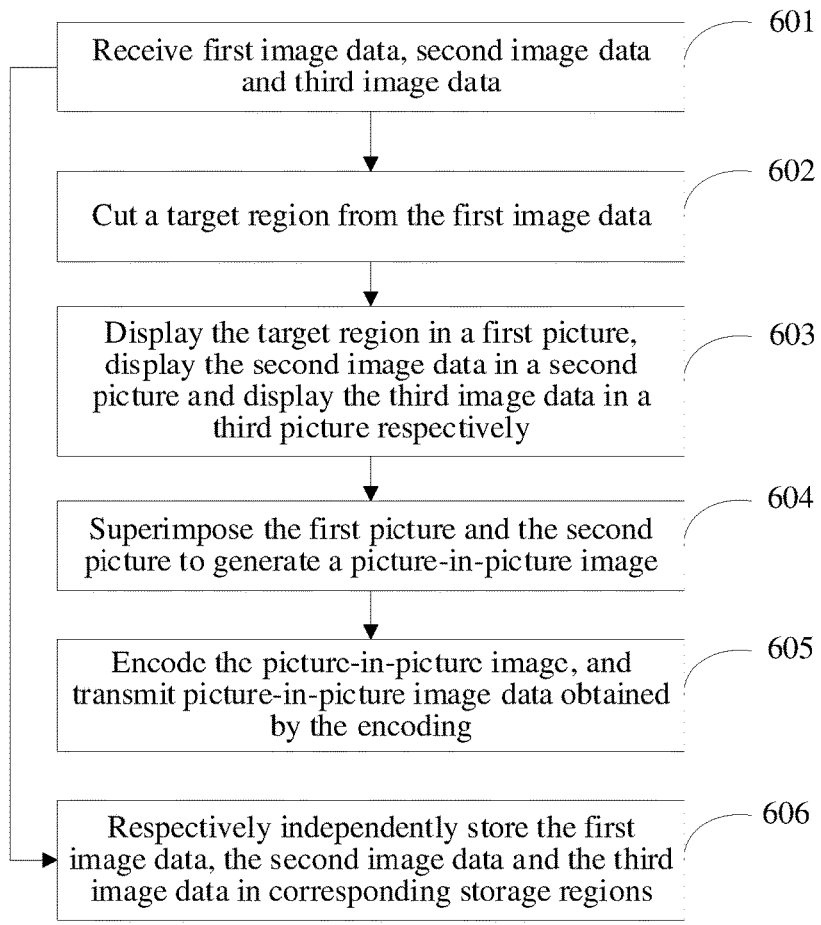
FIG. 7 is a method flowchart of an image processing method according to another embodiment of the present invention.

FIG. 7 is a method flowchart of an image processing method according to an exemplary embodiment of the present invention. As shown in FIG. 7, after step 604, the method may further include the following steps:

605. Encode the picture-in-picture image, and transmit picture-in-picture image data obtained by the encoding.

The encoding process may be completed by an encoding chip or an encoding module. The picture-in-picture image data obtained by the encoding is transmitted, by using an image transmission apparatus, as a channel of complete data to the smart terminal 20 for playing. In other words, the synthesized picture-in-picture image is transmitted.

In such a transmission manner, each data frame sent by the image transmission apparatus is a synchronized picture-in-picture image. Therefore, there is no data synchronization problem among the first picture, the second picture or the third picture, thereby providing better user experience.

Still referring to FIG. 7, the picture-in-picture image is transmitted to the smart terminal 20 after being synthesized. Therefore, original image data acquired by the aerial camera cannot be retained. In some embodiments, in addition to synthesizing the picture-in-picture image, the method may further include the following steps:

606. Respectively independently store the first image data, the second image data and the third image data in corresponding storage regions.

The storage regions may be provided by a mass storage device provided by the aerial camera or the unmanned aerial vehicle. Therefore, the original image data of the aerial camera can also be retained, for exporting and use by the user in the future, thereby reducing repeated aerial photographic reconnaissance and improving a reconnaissance effect.

Figure 9:
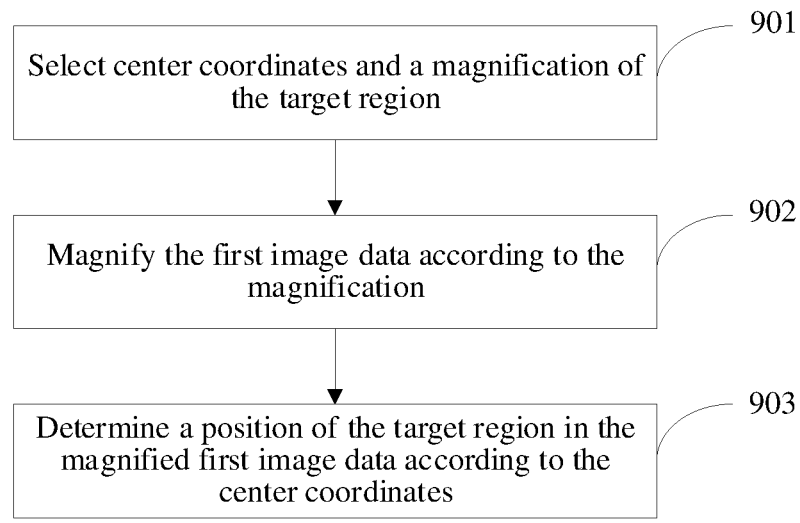
FIG. 9 is a method flowchart of cutting a target region in first image data according to an embodiment of the present invention.

FIG. 9 is a method flowchart of a specific example of cutting a target region according to an embodiment of the present invention. During actual use, the user is allowed to issue control instructions in the smart terminal 20 or another type of remote control to adjust the target region that the user needs to be magnify and view. As shown in FIG. 9, the image processing system may perform the process of cutting the target region by using the following method:

901. Select center coordinates and a magnification of the target region.

The center coordinates refer to a position of a center of the target region in a coordinate system. Usually, the center coordinates may be a two-dimensional coordinate, which can be used for locating the position of the target region. As shown in FIG. 8, to facilitate the user to control and adjust the target region of the user, the position of the center coordinates may be clearly shown on a display with a circle center or another graphic element.

The magnification is a parameter used for indicating a degree of magnification of a local image. The first image data is high-pixel image data. Therefore, when viewing an aerial image on the smart terminal 20, the user may magnify, according to requirements thereof, the target region of interest to obtain more details.

902. Magnify the first image data according to the magnification.

The user may control the magnification (for example, 2 times, 3 times or more) by outputting control instructions on the smart terminal 20 or another remote control. As shown in FIG. 8, after the magnification is determined, a size of the first image data may be magnified to a corresponding multiple.

903. Determine a position of the target region in the magnified first image data according to the center coordinates.

A size of the target region is the same as a size of the first picture. As described above, the size of the first picture may be changed and adjusted according to user instructions. For example, when the first picture is used as the main display picture, the size of the first picture may be the same as the size of the display screen of the smart terminal, so that a picture with a corresponding size is cut in the magnified first image data and displayed in the first picture.

The position of the target region is determined by the center coordinates selected by the user. As shown in FIG. 8, after the center coordinates and the size of the target region are determined, a part that needs to be cut and displayed may be uniquely determined in the magnified first image data.

Figure 10:
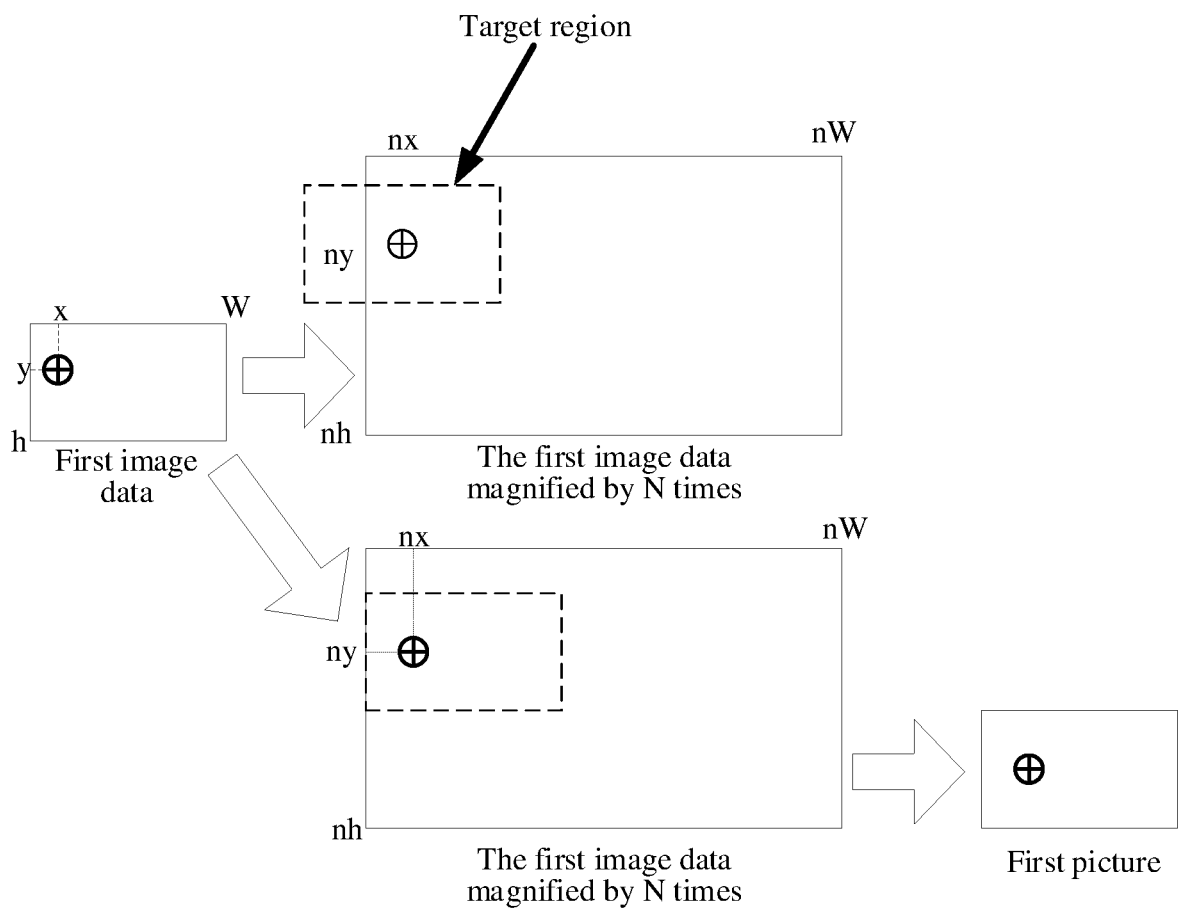
FIG. 10 is a schematic diagram of cutting first image data according to another embodiment of the present invention.

FIG. 10 shows a process of cutting first image data according to an embodiment of the present invention. As shown in FIG. 10, if the position of the center coordinates is excessively close to an edge of the magnified first image data, a partial position of the target region will be vacant and include no image. Therefore, to avoid such a case, in some embodiments, the following steps may be further included:

determining whether distances between the center coordinates and edges of the magnified first image data are greater than an allowable distance first;

if the distances are greater than the allowable distance, determining the case as a normal case, and cutting the target region from the magnified first image data by using the center coordinates as a center of the target region; and if the distances are not greater than the allowable distance, determining the case as the foregoing case of being excessively close, and cutting the target region closely along one of the edges of the magnified first image data, to prevent the target region from being vacant.

The foregoing determining and cutting process are described in detail below by using the embodiment shown in FIG. 10 as an example.

First, when the user observes a region or a target of interest during the aerial photographic reconnaissance, the user may move a cursor to a specific position and issue a magnification instruction by using a smart terminal or an interactive device (for example, a joystick, a mouse rolling wheel or a touch button) of a remote control on a ground side.

Then, after magnifying the first image data to a corresponding multiple according to the magnification instruction, the image processing system determines, according to the size of the first picture and a position of the cursor A (that is, the center coordinates), whether requirements of the allowable distance can be met and therefore maintain the cursor in a center position of the target region.

Determining criteria for the allowable distance include the following four conditions:

$$\text{first condition: } nx \geq \frac{w}{2}$$

$$\text{second condition: } n(w-x) \geq \frac{w}{2}$$

$$\text{third condition: } ny \geq \frac{h}{2}$$

$$\text{fourth condition: } n(h-y) \geq \frac{h}{2}$$

where w and h are respectively an image width and an image height in the first image data, (x, y) is the center coordinates, and n is the magnification.

As shown in FIG. 10, the first condition to the fourth condition respectively indicate approaching degrees between the target region and a left edge, a right edge, a top edge and a bottom edge of the magnified first image data.

Therefore, when one of the conditions is not met, the target region may be cut closely along a corresponding edge (that is, a smallest value is selected). In this case, the center coordinates are not maintained at the center of the target region, and a corresponding offset exists.

In other words, there are four cases of not meeting the allowable distance: cutting the target region closely along the left edge of the magnified first image data when the first condition is not met; cutting the target region closely along the right edge of the magnified first image data when the second condition is not met; cutting the target region closely along the top edge of the magnified first image data when the third condition is not met; or cutting the target region closely along the bottom edge of the magnified first image data when the fourth condition is not met.

When all the conditions are met, it indicates that the magnified first image data is sufficiently large to maintain the cursor A in the center position of the target region.

Certainly, it should be noted that although the cutting of the first image data is used as an example in FIG. 10, a person skilled in the art may alternatively choose to cut image data from a thermal imaging lens and perform displaying in a picture-in-picture image by using the foregoing image processing method without departing from the inventive ideas and principles disclosed in the present invention.

In summary, the image processing system provided in the embodiments of the present invention allows the user to magnify a local region to a specific multiple and accurately view a target of interest during the aerial photographic reconnaissance, and provides a global image, so that the user can grasp and pay attention to an overall image capture situation.

In addition, the real-time transmission and synthesis manner of the picture-in-picture image can enable the user to conveniently view aerial image data in real time in the smart terminal, without a problem that multichannel image data is not synchronized.

A person skilled in the art may use different methods to implement the described functions for each specific application, but this implementation shall not be considered as going beyond the scope of the present invention. The computer software may be stored in a computer-readable storage medium. When being executed, the program may include the processes of the embodiments of the foregoing methods. The storage medium may be a magnetic disk, an optical disc, a read-only memory, a random access memory or the like.

Finally, it should be noted that the foregoing embodiments are merely used to describe the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An image processing method for an aerial camera, comprising:
    receiving first image data and second image data, the first image data being image data from a high-resolution visible light lens and the second image data being infrared data from an infrared thermal imaging lens;
    cutting a target region from the first image data;
    displaying the target region in a first picture and displaying the second image data in a second picture respectively;
    superimposing the first picture and the second picture to generate a picture-in-picture image;
    receiving third image data and displaying the third image data in a third picture, the third image data being image data from a wide-angle lens; and
    superimposing the third picture on the first picture to generate a picture-in-picture image comprising the first picture, the second picture and the third picture.

2. The image processing method according to claim 1, further comprising:
    respectively independently storing the first image data, the second image data and the third image data in corresponding storage regions.

3. The image processing method according to any of claim 1, further comprising: encoding the picture-in-picture image, and transmitting picture-in-picture image data obtained by the encoding.

4. The image processing method according to any of claim 1, wherein the cutting a target region from the first image data specifically comprises:
    selecting center coordinates and a magnification of the target region;
    magnifying the first image data according to the magnification; and
    determining a position of the target region in the magnified first image data according to the center coordinates, a size of the target region being the same as a size of the first picture.

5. The image processing method according to claim 4, wherein the determining a position of the target region in the magnified first image data according to the center coordinates specifically comprises:
    determining whether distances between the center coordinates and edges of the magnified first image data are greater than an allowable distance;
    if the distances are greater than the allowable distance, cutting the target region from the magnified first image data by using the center coordinates as a center of the target region; and
    if the distances are not greater than the allowable distance, cutting the target region closely along one of the edges of the magnified first image data.

6. The image processing method according to claim 5, wherein the determining whether distances between the center coordinates and edges of the magnified first image data are greater than an allowable distance comprises:
    determining that the distances between the center coordinates and the edges of the magnified first image data are greater than the allowable distance when a first condition to a fourth condition below are met simultaneously;

$$\text{first condition: } nx \geq \frac{w}{2}$$
$$\text{second condition: } n(w-x) \geq \frac{w}{2}$$
$$\text{third condition: } ny \geq \frac{h}{2}$$
$$\text{fourth condition: } n(h-y) \geq \frac{h}{2}$$

wherein w and h are respectively an image width and an image height in the first image data, (x, y) is the center coordinates, and n is the magnification.

7. The image processing method according to claim 6, wherein the cutting the target region closely along one of the edges of the magnified first image data comprises:
    cutting the target region closely along a left edge of the magnified first image data when the first condition is not met;
    cutting the target region closely along a right edge of the magnified first image data when the second condition is not met;
    cutting the target region closely along a top edge of the magnified first image data when the third condition is not met; and
    cutting the target region closely along a bottom edge of the magnified first image data when the fourth condition is not met.

8. An unmanned aerial vehicle, comprising:
a vehicle body;
an aerial camera mounted on the vehicle body, wherein the aerial camera comprises a high-resolution visible light lens and an infrared thermal imaging lens;
an image processing system configured to execute the instructions to:
receive first image data and second image data, the first image data being image data from a high-resolution visible light lens and the second image data being infrared data from an infrared thermal imaging lens;
cut a target region from the first image data;
display the target region in a first picture and displaying the second image data in a second picture respectively; and
superimpose the first picture and the second picture to generate a picture-in-picture image;
receive third image data and displaying the third image data in a third picture, the third image data being image data from a wide-angle lens; and
superimpose the third picture on the first picture to generate a picture-in-picture image comprising the first picture, the second picture and the third picture.

9. The unmanned aerial vehicle according to claim 8, wherein the aerial camera further comprises a wide-angle lens.

10. The unmanned aerial vehicle according to claim 8, further comprising a mass storage device, wherein
the mass storage device being configured to independently store image data captured by different lenses of the aerial camera.

11. The unmanned aerial vehicle according to claim 8, further comprising an image encoding chip, wherein
the image encoding chip being configured to encode a picture-in-picture image outputted by the image processing system in a preset encoding format and output the encoded picture-in-picture image.

12. The unmanned aerial vehicle according to claim 8, wherein the image processing system further configured to execute the instructions to:
select center coordinates and a magnification of the target region;
magnify the first image data according to the magnification; and
determine a position of the target region in the magnified first image data according to the center coordinates, a size of the target region being the same as a size of the first picture.

13. The unmanned aerial vehicle according to claim 12, wherein the image processing system further configured to execute the instructions to:
determine whether distances between the center coordinates and edges of the magnified first image data are greater than an allowable distance;
if the distances are greater than the allowable distance, cut the target region from the magnified first image data by using the center coordinates as a center of the target region; and
if the distances are not greater than the allowable distance, cut the target region closely along one of the edges of the magnified first image data.

14. The unmanned aerial vehicle according to claim 13, wherein the image processing system further configured to execute the instructions to:
determine that the distances between the center coordinates and the edges of the magnified first image data are greater than the allowable distance when a first condition to a fourth condition below are met simultaneously;

$$\text{first condition: } nx \geq \frac{w}{2}$$

$$\text{second condition: } n(w-x) \geq \frac{w}{2}$$

$$\text{third condition: } ny \geq \frac{h}{2}$$

$$\text{fourth condition: } n(h-y) \geq \frac{h}{2}$$

wherein w and h are respectively an image width and an image height in the first image data, (x, y) is the center coordinates, and n is the magnification.

15. The unmanned aerial vehicle according to claim 14, wherein the image processing system further configured to execute the instructions to:
cut the target region closely along a left edge of the magnified first image data when the first condition is not met;
cut the target region closely along a right edge of the magnified first image data when the second condition is not met;
cut the target region closely along a top edge of the magnified first image data when the third condition is not met; and
cut the target region closely along a bottom edge of the magnified first image data when the fourth condition is not met.

16. An electronic computing platform comprising:
a memory storing computer executable instructions; and
a processor configured to execute the instructions to:
cut a target region in first image data, the first image data being image data from a high-resolution visible light lens; and
superimpose a first picture and a second picture, to generate a picture-in-picture image, the target region being displayed in the first picture, and second image data being displayed in the second picture, the second image data being infrared data from an infrared thermal imaging lens;
receiving third image data and displaying the third image data in a third picture, the third image data being image data from a wide-angle lens; and
superimposing the third picture on the first picture to generate a picture-in-picture image comprising the first picture, the second picture and the third picture.

17. The electronic computing platform according to claim 16, wherein the processor is further configured to:
encode the picture-in-picture image in a preset encoding format and output the encoded picture-in-picture image.

18. The electronic computing platform according to claim 16, wherein the processor is further configured to:
superimpose a third picture on the first picture, to generate a picture-in-picture image comprising the first picture, the second picture and the third picture, third image data being displayed in the third picture, the third image data being image data from a wide-angle lens.

19. The electronic computing platform according to claim 16, wherein the processor is further configured to:
select center coordinates and a magnification of the target region;

magnify the first image data according to the magnification; and determine a position of the target region in the magnified first image data according to the center coordinates, a size of the target region being the same as a size of the first picture.

20. The electronic computing platform according to claim 19, wherein the processor is further configured to:

determine whether distances between the center coordinates and edges of the magnified first image data are greater than an allowable distance;

cut the target region from the magnified first image data by using the center coordinates as a center of the target region if the distances are greater than the allowable distance; and cut the target region closely along one of the edges of the magnified first image data if the distances are not greater than the allowable distance.

21. The electronic computing platform according to claim 20, wherein the processor is further configured to:

determine that the distances between the center coordinates and the edges of the magnified first image data are greater than the allowable distance when a first condition to a fourth condition below are met simultaneously;

$$\text{first condition: } nx \geq \frac{w}{2}$$

$$\text{second condition: } n(w-x) \geq \frac{w}{2}$$

$$\text{third condition: } ny \geq \frac{h}{2}$$

$$\text{fourth condition: } n(h-y) \geq \frac{h}{2}$$

wherein w and h are respectively an image width and an image height in the first image data, (x, y) is the center coordinates, and n is the magnification.

22. The electronic computing platform according to claim 21, wherein the processor is further configured to:

cut the target region closely along a left edge of the magnified first image data when the first condition is not met;

cut the target region closely along a right edge of the magnified first image data when the second condition is not met;

cut the target region closely along a top edge of the magnified first image data when the third condition is not met; and cut the target region closely along a bottom edge of the magnified first image data when the fourth condition is not met.

* * * * *